United States Patent
Finkenzeller et al.

(10) Patent No.: US 9,544,021 B2
(45) Date of Patent: Jan. 10, 2017

(54) APPARATUS FOR COMMUNICATING WITH A PORTABLE DATA CARRIER

(71) Applicant: GIESECKE & DEVRIENT GMBH, Munich (DE)

(72) Inventors: Klaus Finkenzeller, Unterfohring (DE); Rainer Schmidtke, Unterhaching (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 41 days.

(21) Appl. No.: 14/366,174

(22) PCT Filed: Dec. 17, 2012

(86) PCT No.: PCT/EP2012/005207
§ 371 (c)(1),
(2) Date: Jun. 17, 2014

(87) PCT Pub. No.: WO2013/091818
PCT Pub. Date: Jun. 27, 2013

(65) Prior Publication Data
US 2014/0361877 A1 Dec. 11, 2014

(30) Foreign Application Priority Data
Dec. 19, 2011 (DE) .......................... 10 2011 121 661

(51) Int. Cl.
*H04B 5/00* (2006.01)
*G06K 7/00* (2006.01)

(52) U.S. Cl.
CPC ........... *H04B 5/0031* (2013.01); *G06K 7/0004* (2013.01)

(58) Field of Classification Search
None
See application file for complete search history.

(56) References Cited

U.S. PATENT DOCUMENTS 6,714,990 B1  3/2004 Autio et al.
7,837,119 B2  11/2010 Graf et al.
(Continued)

FOREIGN PATENT DOCUMENTS

| DE | 19530823 A1 | 2/1997 |
| DE | 10317257 A1 | 11/2004 |
| DE | 102005053210 B3 | 4/2007 |
| EP | 2018023 A2 | 1/2009 |
| WO | 2011112158 A1 | 9/2011 |

OTHER PUBLICATIONS

German Search Report for corresponding German Application No. 102011121661.1, created Jul. 25, 2012.
(Continued)

*Primary Examiner* — Daniell L Negron
(74) *Attorney, Agent, or Firm* — Workman Nydegger

(57) ABSTRACT

An apparatus for communicating with a portable data carrier comprises a first communication interface, based on wireless data transfer technology, for receiving and/or transmitting data via a first communication channel, and a second communication interface, based on different contactless data transfer technology, for receiving and/or transmitting data via a second communication channel. A first software interface to the first communication interface via which an application program stored in the apparatus can communicate with the first communication interface. The apparatus has a second software interface via which the application program can communicate with the second communication interface, with the communication from the first software interface to the first communication interface, and vice versa, being passed via the second software interface.

10 Claims, 1 Drawing Sheet

(56) References Cited

U.S. PATENT DOCUMENTS

| | | | |
|---|---|---|---|
| 8,532,074 B2* | 9/2013 | Navda | H04W 4/003 |
| | | | 370/338 |
| 2007/0063055 A1 | 3/2007 | Graf et al. | |
| 2010/0014459 A1* | 1/2010 | Mir | H04L 29/12386 |
| | | | 370/328 |
| 2013/0029646 A1 | 1/2013 | Chowdhury et al. | |
| 2014/0127992 A1* | 5/2014 | Kuscher | H04B 5/0031 |
| | | | 455/41.1 |

OTHER PUBLICATIONS

"Identification Cards—Contactless Integrated Circuit Cards—Proximity Cards, Part 1: Physical Characteristics," International Standard ISO/IEC 14443-1, 2nd edition, Jun. 15, 2008, pp. 1-4.
"Identification Cards—Contactless Integrated Circuit Cards—Proximity Cards, Part 2: Radio Frequency Power and Signal Interface," International Standard ISO/IEC 14443-2, 2nd edition, Sep. 1, 2010, pp. 1-24.
"Identification Cards—Contactless Integrated Circuit Cards—Proximity Cards, Part 3: Initialization and Anticollision," International Standard ISO/IEC 14443-3, 2nd edition, Apr. 15, 2011, pp. 1-60.
"Identification Cards—Contactless Integrated Circuit Cards—Proximity Cards, Part 4: Transmission Protocol," International Standard ISO/IEC 14443-4, 2nd edition, Jul. 15, 2008, pp. 1-37.
International Search Report for corresponding International PCT Application No. PCT/EP2012/005207, mailed May 28, 2013.
Wikipedia, "Tethering," URL: http://en.wikipedia.org/w/index.php?title=Tethering, downloaded on May 13, 2013.

* cited by examiner

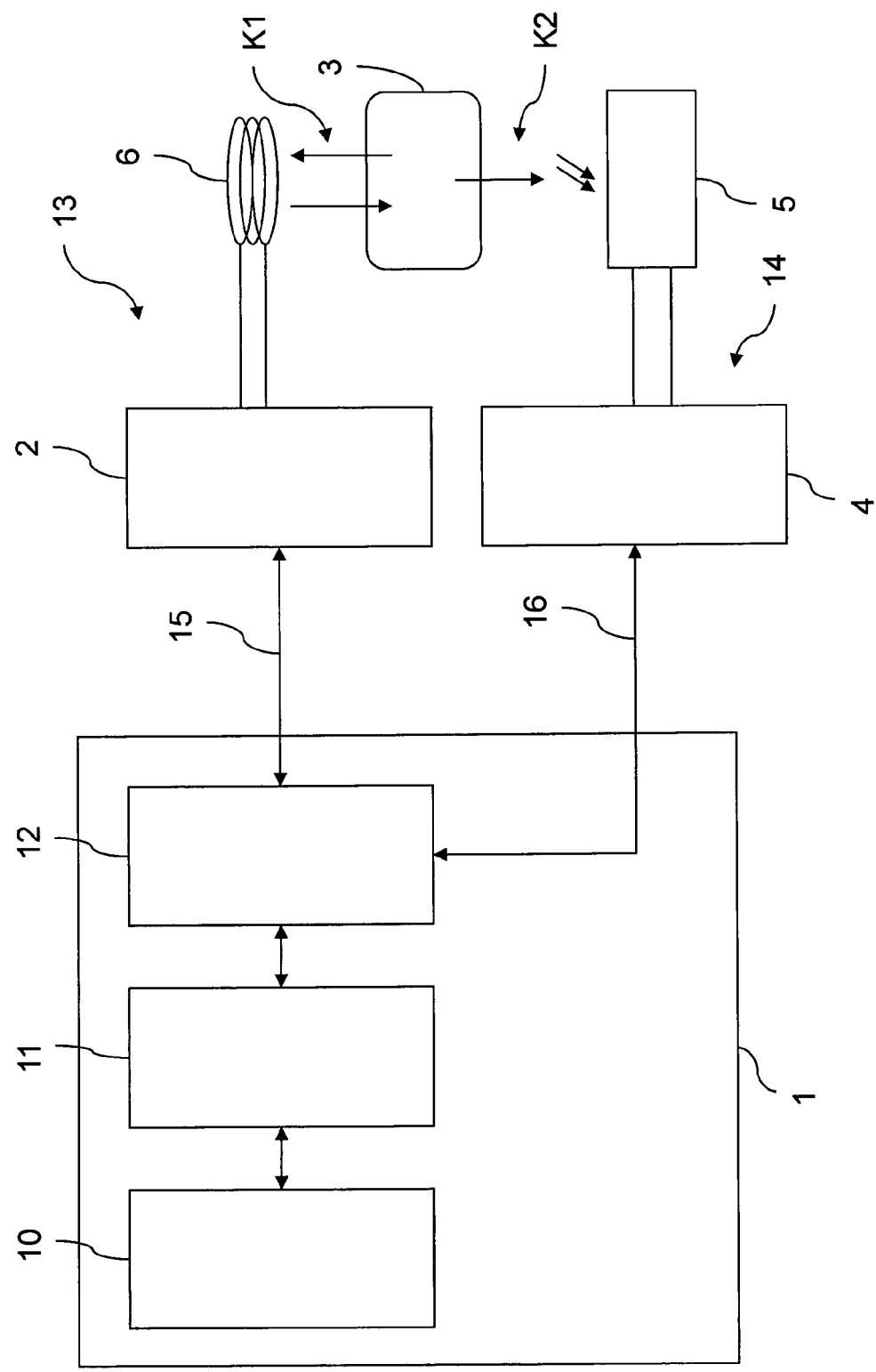

APPARATUS FOR COMMUNICATING WITH A PORTABLE DATA CARRIER

BACKGROUND

This invention relates to an apparatus for communicating with a portable data carrier and to a method for communicating between an apparatus and a portable data carrier.

It is known to carry out a contactless communication between a reading device and a portable data carrier, such as e.g. a chip card, smart card, etc. For example, RFID (radio frequency identification) systems are used for contactless communication in order to carry out a communication between the reading device and the portable data carrier via an alternating magnetic field of the reading device. In RFID systems, the reading device possesses an antenna coil for producing the alternating magnetic field. The portable data carrier likewise comprises an antenna coil in order to draw the required energy from the alternating magnetic field. A combination of the antenna coil with a circuit of the portable data carrier is designated a transponder. Via the alternating magnetic field, data are also transferred between the transponder and the reading device.

It is furthermore known to equip a portable data carrier with an optical interface, namely an infrared interface, which can be configured as a transmitting apparatus, a receiving apparatus or a switchable transmitting/receiving apparatus, and constitutes an alternative data transfer channel. To use the infrared interface of the portable data carrier for transmitting data to a reading device, the infrared interface must be supplied with sufficient energy. For this purpose it has been proposed to utilize the conventional antenna coil in order to supply the infrared interface with sufficient energy via the alternating magnetic field of the reading device. The data and energy transfer is effected here via two different, contactless interfaces. The additional infrared interface constitutes an additional data transfer channel which can be configured as a transmitting apparatus, a receiving apparatus or a switchable transmitting/receiving apparatus.

When employing portable data carriers having two different, contactless interfaces, there is the problem for communication apparatuses that there must be provided, besides an interface to a contactless-type reading device, an additional interface for processing optical signals. This leads to problems in particular with the software applications implemented on the apparatuses, normally requiring that an existing application software be reworked.

Thus, a solution is required for how a reading device originally adapted only for contactless communication with a portable data carrier via a single contactless interface can be subsequently fitted in a simple manner such that a data communication between the reading device and the data carrier can also be effected via another contactless interface. For this purpose, DE 10 2005 053 210 B3 proposes converting infrared signals into contactless communication signals by means of an accordingly configured transponder. The disadvantage of this solution is the fact that a further transponder for the data conversion is required in addition to the reading device.

SUMMARY

It is an object of the present invention to provide a solution for how an apparatus originally adapted only for contactless communication with a portable data carrier via a single contactless interface can be so developed that additional components, such as a transponder, can be avoided. A further object of the invention is to provide a corresponding method for communicating between such an apparatus and a portable data carrier.

The invention provides an apparatus for communicating with a portable data carrier. The apparatus comprises a first communication interface, based on wireless data transfer technology, for receiving and/or transmitting data via a first communication channel. Further, the apparatus comprises a second communication interface, based on different contactless data transfer technology, for receiving and/or transmitting data via a second communication channel. While the first communication interface of the apparatus can comprise a reading device for producing an alternating magnetic field, the second communication interface is based for example on an optical interface, for example an infrared interface. The communication interfaces can be an integral part of the apparatus, but also be connected via corresponding interfaces to a separate apparatus, for example a computer. The communication interfaces can then be attached to the apparatus for example via a cable-type interface, such as e.g. USB.

The apparatus further comprises a first software interface to the first communication interface, via which an application program stored in the apparatus can communicate with the first communication interface. The first software interface is for example a computer-smart card interface, but any other standardized interface can also be employed as a software interface. The function of the first software interface is to translate data obtained from the application program, in particular application data and/or control sequences, into commands of the first communication interface, and vice versa.

Further, the apparatus comprises a second software interface via which the application program can communicate with the second communication interface, with the communication from the first software interface to the first communication interface, and vice versa, being passed via the second software interface.

Through the second software interface it is possible to make the data received at the second communication interface available to the application program. If the communication also from the first software interface to the first communication interface is passed via the second software interface, the additional, second communication channel between the portable data carrier and the apparatus can be integrated into the apparatus without changing the existing application software. It is merely necessary to additionally provide the second software interface through which also the communication from the first software interface to the first communication interface is passed.

Through the additional second communication channel between the portable data carrier and the application program, it is possible to increase the security of a contactless communication between the apparatus and the data carrier in a simple manner. This can be achieved for example by a random number requested by the apparatus being transmitted via the additional, second communication channel through a command, while no, or invalid, data are transferred via the first communication channel.

Expediently, the total communication from the first software interface to the first communication interface is passed via the second software interface. Likewise, it is expedient when data received at the second communication interface are transferred to the application program via the second software interface. The second software interface passes data exchanged between the application program and the first communication interface on to the respective receiver bidirectionally.

It is further expedient when the first software interface is configured for translating data obtained from the application program, in particular application data and/or control sequences, into commands of the first communication interface, and vice versa. The functionality of the first software interface thus does not differ from those software interfaces as are used in conventional apparatuses for communicating with a portable data carrier via a reading device for producing an alternating magnetic field. The first software interface can be a standardized interface, e.g. a PC/SC, TCP/IP or RS232 interface. The first software interface can be configured in particular for processing whole command sequences, as are frequently employed for example when setting up a communication relationship with a portable data carrier.

It is further expedient when the second software interface is configured for analyzing and interpreting the data transferred between the first software interface and the first communication interface. It is further expedient when the second software interface is configured for processing the data received at the first or at the second communication interface, and transferring them to the application program, selectively, in dependence on the result of an analysis of the data transferred from the first communication interface. For example, the data received at the non-relevant communication interface can be discarded. If for example a command is sent from the apparatus to the portable data carrier to which a response via the second communication interface is expected, it can be provided that, instead of the response of the first communication interface, the data received via the second communication interface are passed to the application program. The application data received by the first communication interface can be discarded, however, since these data contain no valid data.

It is further expedient when the second software interface is configured for adjusting and/or changing data received from the first software interface, in particular commands for the first communication interface, in order to activate a communication via the second communication interface. Thus, a response basically expected at the first communication interface can be "redirected" to the second communication interface through the second software interface, for example for securing the communication of the apparatus with the portable data carrier. Said redirecting is effected such that, in a command transferred to the data carrier, the data carrier is prompted to emit the result of the processing via an interface corresponding to the second communication interface.

The advantage of the apparatus according to the invention consists in that neither the hardware of the apparatus nor data carriers need to be modified with two different contactless interfaces. It is only necessary to provide the additional second software interface in the apparatus, which monitors or organizes the communication between an application software running on the apparatus and the two communication interfaces of the apparatus.

The invention further provides a method for communicating between an apparatus and a portable data carrier, the apparatus comprising a first communication interface, based on wireless data transfer technology, for receiving and/or transmitting data via a first communication channel, and a second communication interface, based on different contactless data transfer technology, for receiving and/or transmitting data via a second communication channel. In the method according to the invention, an application program stored in the apparatus communicates with the first communication interface via a first software interface. A communication from the first software interface to the first communication interface, and vice versa, is passed via a second software interface, the application program communicating with the second communication interface via the second software interface.

The method proposed according to the invention has the same advantages as were explained in connection with the apparatus according to the invention.

BRIEF DESCRIPTION OF THE DRAWINGS

The invention will hereinafter be explained more closely with reference to an exemplary embodiment in the drawing. The single FIGURE shows a schematic representation of an apparatus according to the invention for communicating with a portable data carrier.

DETAILED DESCRIPTION OF VARIOUS EMBODIMENTS

The apparatus according to the invention comprises a computing unit 1, for example a computer, laptop or a terminal to which is attached for forming a first communication interface 13 an RFID reading device 2 with an antenna coil 6 for producing an alternating magnetic field for communicating via a first communication channel K1 with a portable data carrier 3. The reading device 2 can be configured for example for communicating with contactless chip cards according to the standard ISO/IEC 14443. Further, for forming a second communication interface 14 there is provided a second reading device 4, which is configured for example for receiving and/or emitting infrared signals. A transmitting/receiving unit to this effect, for example an IrDA receiver, is marked by the reference sign 5, being coupled to the second reading device 4 via corresponding lines for data exchange. The RFID reading device 2 and the further reading device 4 can be connected to the computing unit 1 of the apparatus according to the invention for exchanging data via a respective cable-type connection 15, 16. For example, an attachment of the respective reading devices 2, 4 can be effected via a USB interface or also another interface.

A second, additional communication channel K2 is configured between an optical interface (not specifically represented) of the data carrier 3 and the receiver 5 of the second reading device 4. While the communication connection K1 enables both the transfer of data and the transfer of energy in the conventional manner, only data can be exchanged via the second communication channel K2. The supply of energy to the transmitting/receiving unit of the portable data carrier 3 as well as its optical interface is effected for example via the energy drawn from the alternating magnetic field of the antenna coil 6.

The portable data carrier 3 may be for example a chip card, a smart card, etc., which has interfaces, configured so as to correspond to the interfaces of the apparatus according to the invention, for communicating with the RFID reading device 2 and for communicating with the optical transmitting/receiving unit 5 of the second reading device 4.

The computing unit is shown very schematically. Only the components relevant for the invention are represented. The computing unit has an application program (application software) 10, a first software interface 11 to the RFID reading device 2 as well as a second software interface 12 to the further, second reading device 4. The first software interface 11 is for example a PC/SC interface (i.e. an interface between a computer and a smart card). However, other, standardized interfaces can also be employed, for example according to TCP/IP or RS232.

Further components of the computing unit 1, such as for example an operating system or an operator interface, are not represented since they are not of importance to the invention.

In a manner known to the person skilled in the art, the application program 10 sends application data and control sequences to the first software interface 11, or the application program 10 receives application data and status messages back from the first software interface 11. The function of the first software interface 11 is to translate the received control sequences and application data into complex commands which are then sent from the first software interface 11 to the RFID reading device 2. The first software interface can thereby also process complete sequences, such as for example the sequence REQUEST→ANTICOLLISION→SELECT, as for setting up a communication relationship between an apparatus and a portable data carrier.

It is now to be made possible for the apparatus 1 to increase the security of the contactless communication between the data carrier 3 and the apparatus 1 by employing the additional communication channel K2 between the portable data carrier 3 and the application program 10. Thus, it is e.g. not possible to read out a contactless data carrier 3 unnoticedly or unintentionally when it is secured via the additional communication channel K2. The security is increased in particular by the two communication channels K1, K2 being based on different transfer principles. For example, it is known to send via the additional communication channel K2 a random number requested by the apparatus or the application program 10 by a command ("Get Challenge"), while no, or invalid, data are transferred on the first communication channel K1 (i.e. the contactless interface). The data sent via the second communication channel K2 (i.e. the optical channel) are received at the second communication interface 14, i.e. the transmitting/receiving unit 5.

To make the data received on the second communication interface 14 available to the application program 10, the above-mentioned second software interface 12 is employed. In particular, it is provided in this connection that the total communication between the first software interface 11 and the RFID reading device 2 is passed completely via the additional, second software interface 12.

The second software interface analyzes and interprets the data stream between the first software interface 11 and the RFID reading device 2. If for example a command is sent from the first software interface 11 to which a response via the first communication interface 13 (i.e. via the RFID reading device 2) is expected, it is provided that, instead of the response of the RFID reading device 2, the data received via the second communication interface 14 (i.e. the further reading device 4) are passed to the application program 10. The application data received from the RFID reading device 2 can be discarded, however, since they contain no valid data.

It can further be provided that the second software interface 14 so adjusts or changes commands sent from the first software interface 11 to the RFID reading device 2 that a communication via the second communication channel K2 can be activated therewith.

The invention claimed is:

1. An apparatus for communicating with a portable data carrier, comprising:
    a first communication interface, based on contactless data transfer technology, for receiving and/or transmitting data to/from the portable data carrier via a first communication channel;
    a second communication interface, based on different contactless data transfer technology, for receiving and/or transmitting data to/from the portable data carrier via a second communication channel;
    a first software interface to the first communication interface via which an application program stored in the apparatus can communicate with the first communication interface; and
    a second software interface via which the application program can communicate with the second communication interface, with the communication from the first software interface to the first communication interface, being passed via the second software interface,
    wherein the second software interface is configured for analyzing and interpreting the data transferred between the first software interface and the first communication interface, and
    wherein the second software interface is configured for accessing and processing the data transferred from the first communication interface, and subsequently transferring the accessed data to the application program, selectively, in dependence on the result of an analysis of the data transferred from the first communication interface.

2. The apparatus according to claim 1, wherein the total communication from the first software interface to the first communication interface is passed via the second software interface.

3. The apparatus according to claim 1, wherein data received at the second communication interface are transferred to the application program via the second software interface.

4. The apparatus according to claim 1, wherein the first software interface is configured for translating data obtained from the application program, in particular application data and/or control sequences, into commands of the first communication interface.

5. The apparatus according to claim 1, wherein the second software interface is configured for adjusting and/or changing data received from the first software interface, including commands for the first communication interface, in order to activate a communication via the second communication interface.

6. A method for communicating between an apparatus and a portable data carrier, wherein the apparatus comprises a first communication interface, based on contactless data transfer technology, for receiving and/or transmitting data via a first communication channel, and a second communication interface, based on different contactless data transfer technology, for receiving and/or transmitting data to/from the portable data carrier via a second communication channel, wherein
    an application program stored in the apparatus communicates with the first communication interface via a first software interface, the first communication interface receiving and/or transmitting data to/from the portable data carrier; and
    a communication from the first software interface to the first communication interface, is passed via a second software interface, the application program communicating with the second communication interface via the second software interface, wherein the second software interface analyzes and interprets the data transferred between the first software interface and the first communication interface; and wherein the second software interface processes the data transferred from the first communication interface and received at the second communication interface, and transfers them to the application program, selectively in dependence on the result of an analysis of the data transferred from the first communication interface.

7. The method according to claim 6, wherein the total communication from the first software interface to the first communication interface is passed via the second software interface.

8. The method according to claim 6, wherein data received at the second communication interface are transferred to the application program via the second software interface.

9. The method according to claim 6, wherein the first software interface translates data obtained from the application program including application data and/or control sequences, into commands of the first communication interface.

10. The method according to claim 6, wherein the second software interface adjusts and/or changes data received from the first software interface including commands for the first communication interface, in order to activate a communication via the second communication interface.

* * * * *